United States Patent
Anliker

(10) Patent No.: US 10,687,656 B2
(45) Date of Patent: Jun. 23, 2020

(54) COFFEE MACHINE

(75) Inventor: Markus Anliker, Granichen (CH)

(73) Assignee: RANCILIO GROUP S.p.A., Villastanza di Parabiago (MI) (IT)

( * ) Notice: Subject to any disclaimer, the term of this patent is extended or adjusted under 35 U.S.C. 154(b) by 1218 days.

(21) Appl. No.: 12/738,052

(22) PCT Filed: Sep. 3, 2008

(86) PCT No.: PCT/CH2008/000370
§ 371 (c)(1),
(2), (4) Date: May 13, 2010

(87) PCT Pub. No.: WO2009/049431
PCT Pub. Date: Apr. 23, 2009

(65) Prior Publication Data
US 2010/0218687 A1 Sep. 2, 2010

(30) Foreign Application Priority Data
Oct. 16, 2007 (CH) ...................... 1605/07

(51) Int. Cl.
*A47J 31/44* (2006.01)
*A47J 31/00* (2006.01)
*A47J 31/36* (2006.01)

(52) U.S. Cl.
CPC ........... *A47J 31/4403* (2013.01); *A47J 31/00* (2013.01); *A47J 31/36* (2013.01); *A47J 2201/00* (2013.01)

(58) Field of Classification Search
CPC ........ A47J 2201/00; A47J 31/00; A47J 31/36; A47J 31/4403
(Continued)

(56) References Cited

U.S. PATENT DOCUMENTS 4,389,925 A * 6/1983 Piana ..................... 99/289 R
5,367,947 A * 11/1994 Lussi et al. ................. 99/287
(Continued)

FOREIGN PATENT DOCUMENTS

EP 0 761 150 A1 3/1997
FR 2 544 185 A3 10/1984

OTHER PUBLICATIONS

Merriam-Webster.com at "http://www.merriam-webster.com/dictionary/housing" (accessed Dec. 18, 2019).*
(Continued)

*Primary Examiner* — Tu B Hoang
*Assistant Examiner* — Diallo I Duniver
(74) *Attorney, Agent, or Firm* — Sughrue Mion, PLLC

(57) ABSTRACT

A coffee machine for automatic preparation of coffee or espresso includes a housing (1) with components arranged therein for the preparation and dispensing of coffee and components (10, 11, 12) for the supply of hot water and the supply of steam. The housing (1) is subdivided by a partition (6) into two compartments (8, 9), namely a front compartment (8) that accommodates the components for the preparation and dispensing of coffee, and a rear compartment (9) that contains the carrier element (7). The components (10, 11, 12) for the supply of hot water and the supply of steam are arranged in the carrier element (7). The partition (6) provides thermal separation and shielding between the two compartments (8, 9) and a dry-moist separation. This modular structure substantially eases and simplifies the assembly and service tasks on the coffee machine.

19 Claims, 2 Drawing Sheets

Figure 1:
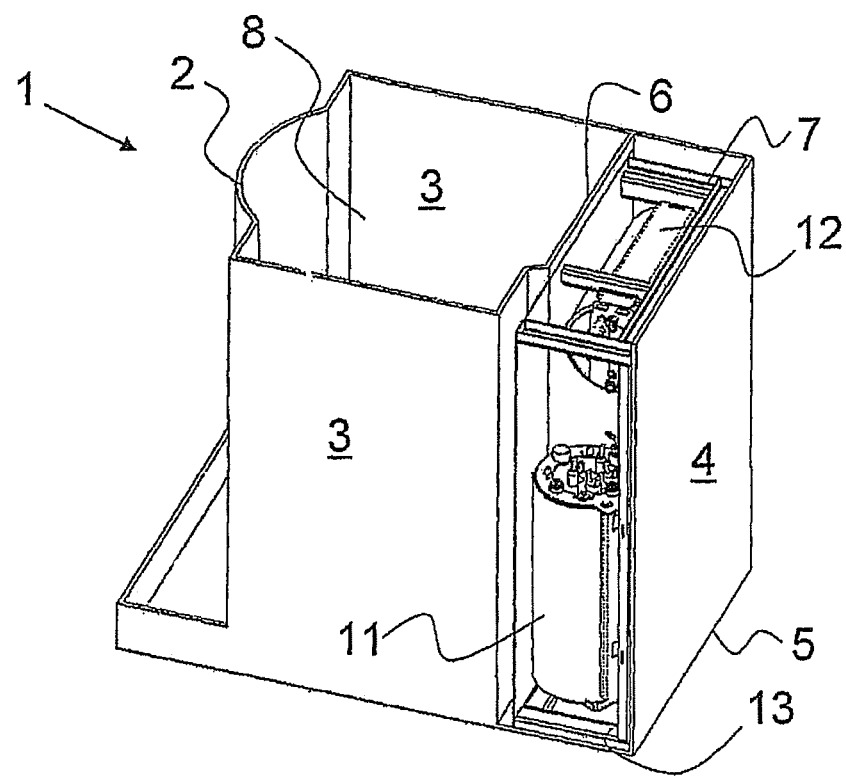

(58) Field of Classification Search
USPC .......................................................... 99/295
See application file for complete search history.

(56) References Cited

U.S. PATENT DOCUMENTS

| | | | | |
|---|---|---|---|---|
| 5,370,040 A | * | 12/1994 | Andrew et al. .................. | 99/295 |
| 5,813,318 A | * | 9/1998 | Zanin .................... | A47J 31/007 |
| | | | | 99/291 |
| 5,957,033 A | * | 9/1999 | In-Albon ......................... | 99/284 |
| 6,101,923 A | * | 8/2000 | Karg ................... | A47J 31/3614 |
| | | | | 99/289 D |

OTHER PUBLICATIONS

Merriam-Webster.com at "http://www. merriam-webster.com/dictionary/compartment" (accessed Dec. 18, 2019).*

* cited by examiner

COFFEE MACHINE

The present invention refers to a coffee machine according to the preamble of claim 1.

This kind of fully automatically functioning coffee machines, also called coffee automats, permit the preparation, at the press of a button, of a coffee beverage and are in particular employed in the catering business. These machines are, as a rule, large in volume and are installed in a fixed position in the bar area. They consist of a housing in which all components of the coffee automat are arranged. These components can be roughly divided into two groups. The first group contains the components for the provision of the hot water and, if available, of the steam and the second group contains the components for the preparation of the coffee. The first group includes the drinking water supply and a pump which feeds one or several boilers for the supply of hot water and possibly steam as well as means, such as pipes and valves for the transport of the heated drinking water to the brewing device. The second group includes the powder preparation and one or several brewing groups with the drive and control means for the brewing device as well as an electronic control device for the coffee automat. These coffee automats require a relatively high level of maintenance. Since all components are arranged in one housing it is unavoidable that the fine dust resulting from the grinding of the coffee is deposited on the boiler walls and the pump casing. The mechanical structural elements are therefore often soiled with coffee powder. Since on the inside of the coffee machine, to some extent, condensation is also generated by the heating up and cooling off and the dust from the grinding deposits above all on the damp surfaces. Furthermore, the compact structure causes longer operational downtimes in case of breakdowns, since the disassembling of individual parts, such as a pump for instance, or a control valve or a boiler is a relatively elaborate procedure.

It is therefore the object of the present invention to provide a coffee machine which is maintenance-friendly and operation-friendly and which can be easier to manufacture and quicker to assemble.

This object is accomplished by a coffee machine with the features of claim 1.

The invention is based upon the idea of separating the above-mentioned groups of components of a coffee automat inside the housing and to combine the components for the provision of the brewing water and steam with the drinking water supply, the pump and the boilers as well as the control valves in a carrier element which is removable from the housing and accommodates these components. This carrier element is, according to the invention, similar to a drawer arranged in the rear area of the housing of the coffee machine and which can be slid laterally into the housing. The second group with the components for the preparation of the coffee and the electronic controls are arranged in the front part of the housing. The housing itself can be correspondingly subdivided by a partition wall or by struts, wherein the carrier slid into the housing is fastened onto the partition wall or struts. For service and repair tasks it is sufficient to unfasten the carrier element from the partition wall and to pull the carrier element laterally out of the housing.

The components assembled in the carrier are already completely accessible for most service tasks even if this is only partially pulled out of the housing. For this purpose the water pipes and the electrical connections do not have to be disconnected from the control and regulation groups, but each individual component can be separately removed and/or replaced. For the assembling of the coffee machine the components for the provision of water and steam are built into the carrier element. Independently of this the components for the preparation of the coffee can be built into the housing. Finally the carrier element just needs to be slid into the housing, fastened and the electrical wires as well as the water and steam supply are connected to the corresponding connections in the coffee automat. This modular structure substantially eases and simplifies the assembly of and the service tasks on the coffee machine.

Further advantages of the invention are clear from the dependent claims and from the following description in which the invention is explained in more detail by means of an exemplary embodiment illustrated in the schematic drawings.

Figure 2:
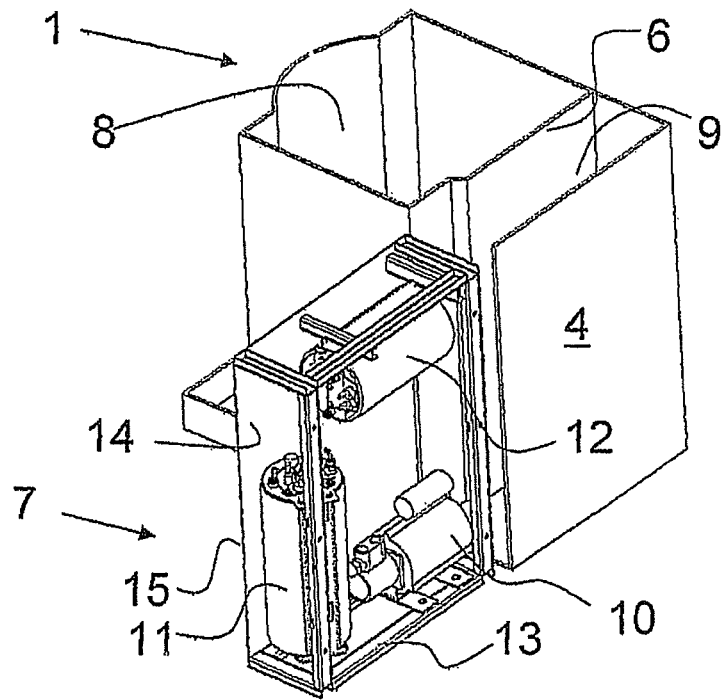
Figure 3:
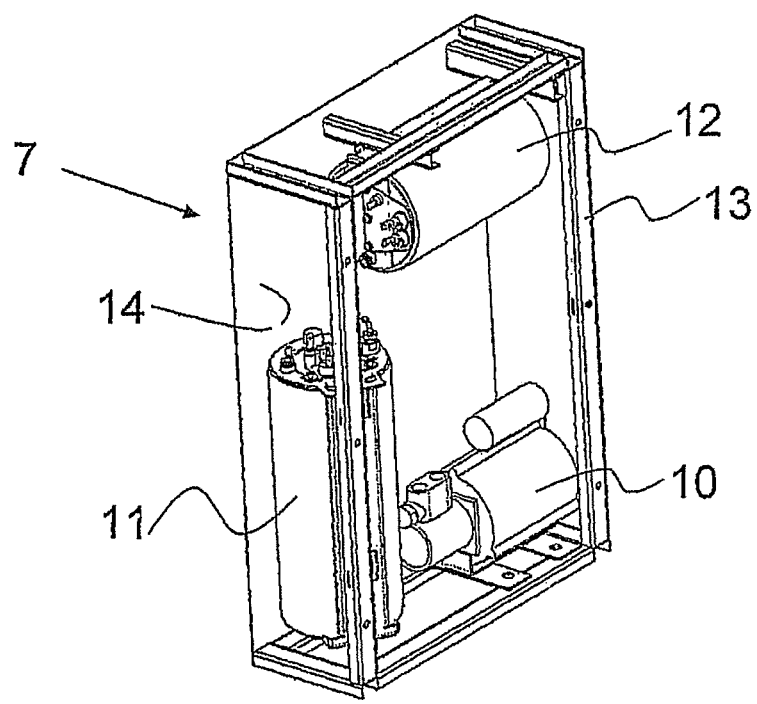

They show:

FIG. 1 a simplified perspective representation of an exemplary embodiment of a housing of a coffee machine with a carrier element slid into the housing;

FIG. 2 a schematic representation of a housing as in FIG. 1, however with a carrier element partially pulled out of the housing;

FIG. 3 a schematic representation of an exemplary embodiment of a carrier element in a perspective view.

In the figures the same reference numerals have been used for the same elements and initial explanations refer to all figures unless otherwise expressly stated.

In FIG. 1 the housing 1 of the coffee machine according to the invention is illustrated in a simplified perspective view. The housing 1 includes a front face 2, side walls 3, a back wall 4, a bottom 5 and an upper covering not shown in the drawing. The housing 1 is subdivided by means of a partition 6 into two compartments 8, 9, namely a front compartment 8 and a rear compartment 9. In the front compartment 8 the components for the preparation and pouring of the coffee are arranged. Part of this are the powder preparation, one or several brewing groups with the drive and control means for the brewing device, an electronic control for the coffee automat and the coffee dispensing element. These components of the coffee automat are not illustrated in the drawings. The rear compartment 9 of the housing 1 forms a sort of slide-in compartment together with the partition wall 6 and the back wall 4 in which a drawer-like carrier element 7 can be slid laterally into the housing 1. The components for the hot water supply and the steam supply are arranged in this carrier element 7. In the drawing, in the area of the rear compartment 9, the covering of the side wall 3 is cut out so that the carrier element 7, slid into the rear compartment 9, is partially visible. The carrier element 7 is firmly fastened to the partition wall 6, for example by means of screwing. The subdivision of the housing 1 into two compartments 8, 9 can also be done with struts onto which the carrier element 7 is fastened. The drawer-like carrier element 7 is preferably comprised of a possibly parallelepiped frame 13 with at least a side wall which forms the mounting wall 14 and which can be screwed together with the partition wall 6 or the struts. The components for the hot water supply and the steam supply are arranged in the carrier element 7.

FIG. 2 shows, in a schematic perspective view, the housing 1 of the coffee machine as in FIG. 1, however with the carrier element 7 partially pulled out of the housing 1. It is possible to see the pump 10 and two cylinder-shaped boilers 11, 12 arranged and fixed in the carrier element 7. The vertically aligned boiler 11 serves for the generation of steam and the horizontally aligned boiler 12 in the upper area of the carrier element 7 serves for the supply of hot water. Connection hoses, control elements as well as electrical connections and links similarly arranged in the carrier element 7 are not shown in the figures. The water, steam and electrical connections to the components for the coffee preparation and control in the front compartment 8 of the housing 1 run along the side wall 3 past the edge 15 of the partition and/or mounting wall 14. This permits a partial pulling out of the carrier element 7 from the housing 1 without all of the hoses and electrical connections of the components in the front compartment 8 having to be disconnected—which makes repair and service work substantially easier. In the case of more major repair tasks the electrical and hose connections can simply be disconnected and, for example, an entire carrier element 7 can be removed from the coffee machine and replaced by a new one. The coffee machine is thus in working condition again in a very short time and the repair tasks can be carried out on the replaced carrier element in a different location.

In FIG. 3 the carrier element 7 is shown in a schematic illustration with the components arranged in it for the supply of hot water and steam. The pump 10 is mounted onto the lower framework part of the carrier element 7. In the upper area of the carrier element 7 the boiler 12 for hot water supply and the boiler 11 for steam supply, which is arranged laterally in a vertical position, can be seen. By virtue of the partition wall 6 and/or the mounting wall 14 there is, within the housing 1, on the one hand a thermal separation and shielding between the two compartments 8, 9 and on the other hand to a great extent a separation between a dry and a moist area.

In a further exemplary embodiment coupling elements for the connection of the electrical supply and control wires, as well as for the water and steam pipes, are arranged on the carrier element 7. The corresponding coupling elements are arranged in the compartment 9 of the housing 1. By sliding the carrier element 7 into the compartment 9 of the housing 1 the corresponding conduits are connected by means of their coupling elements. By separating the couplings the carrier element 7 can be removed from the housing in a simple manner and with rapidity and, in the case of repairs, be replaced.

By means of this modular structure both service tasks and mounting tasks are substantially simplified. The group of components for the hot water and steam supply can be pre-assembled in the carrier element 7 or replaced independently of the rest of the coffee machine. Of course the carrier element 7 can also contain further control elements, if required.

The invention claimed is:

1. A coffee machine for preparation of an espresso, the coffee machine comprising:
   a button that when pressed triggers automatic preparation by the machine of the espresso;
   a housing with a first set of components arranged therein for the preparation and dispensing of coffee in a container and a second set of components for the supply of at least hot water and steam, wherein:
   the housing is subdivided by a partition into two compartments, a first compartment that is a front compartment positioned to face the container to receive coffee for consumption and containing the first set of components, said first set of components comprising a powder preparation component, at least one brewing group and a dispensing component for dispensing the espresso, and a second compartment that is a rear compartment containing a carrier element, the carrier element containing the second set of components for the supply of at least hot water and steam to the components for dispensing the coffee contained in the first compartment,
   said second set of components comprising a water line for supplying water, a pump and a first boiler and a second boiler, the first boiler configured for the supply of hot water under pressure to the dispensing component for espresso preparation and the second boiler configured for the supply of steam under pressure to the dispensing component for espresso preparation;
   wherein the carrier element is slidably removable from corresponding electrical and water connections within the second compartment as a module, together with the first boiler and the second boiler and the pump; and
   wherein the pump feeds both the first boiler for the supply of hot water and the second boiler for the supply of steam under pressure to the at least one brewing group and the espresso is dispensed by the dispensing component for espresso preparation.

2. The coffee machine according to claim 1, wherein the partition is made by a partition wall in such a way that the rear compartment forms a slide-in compartment.

3. The coffee machine according to claim 1, wherein the housing is subdivided into two compartments by means of struts.

4. The coffee machine according to claim 2, wherein that the carrier element can be slid laterally into the housing and is screwable onto the partition wall.

5. The coffee machine according to claim 3, wherein the carrier element can be slid laterally into the housing and is screwable onto the struts.

6. The coffee machine according to claim 1, wherein the carrier element is formed by a parallelepiped frame.

7. The coffee machine according to claim 2, wherein the carrier element is formed by a parallelepiped frame.

8. Cof The coffee fee machine according to claim 3, wherein the carrier element is formed by a parallelepiped frame.

9. The coffee machine according to claim 1, wherein coupling elements for the connection of the electrical supply and control wires, as well as for the water and steam pipes, are provided in the carrier element and that corresponding coupling elements are arranged in the second compartment of the housing.

10. The coffee machine according to claim 2, wherein coupling elements for the connection of the electrical supply and control wires, as well as for the water and steam pipes, are provided in the carrier element and that corresponding coupling elements are arranged in the second compartment of the housing.

11. The coffee machine according to claim 3, wherein coupling elements for the connection of the electrical supply and control wires, as well as for the water and steam pipes, are provided in the carrier element and that corresponding coupling elements are arranged in the second compartment of the housing.

12. A coffee machine for preparation of an espresso beverage, the coffee machine comprising:
   a button that when actuated triggers automatic preparation by the machine of the espresso;
   controls activated by pressing the button that operate the coffee machine to automatically prepare the espresso beverage, including powder preparation and water treatment;
   a housing comprising at least a first compartment and a second compartment, the first compartment separated from the second compartment by a partition wall;

the first compartment comprising a first set of components, including a powder preparation component, at least one brewing group, and a dispensing component for dispensing the espresso beverage in a container for consumption;

the second compartment comprising a second set of components including a first boiler, a second boiler, a pump and water line for generation and supply at least of hot water under pressure and steam under pressure to one or more components of the first set of components for the espresso preparation, wherein the pump generates water under pressure sufficiently and supplies the water under pressure to the dispensing component for the espresso preparation, the first boiler configured for the supply of the hot water under pressure to the dispensing component for espresso preparation and the second boiler configured for the supply of steam under pressure, the second compartment comprising a carrier to which the second set of components are mounted, wherein the carrier is slidably removable from corresponding electrical and water connections within the second compartment as a module, together with the first boiler and the second boiler and the pump; and wherein the pump feeds both the first boiler for the supply of hot water and the second boiler for the supply of steam under pressure to the at least one brewing group and the espresso is dispensed by the dispensing component for espresso preparation.

13. The coffee machine according to claim 12, wherein the housing has an opening through which the module is removable and the housing has a removable cover that closes the opening.

14. The coffee machine according to claim 13, wherein the module is removable by sliding out of the housing laterally through the opening.

15. The coffee machine according to claim 12, wherein the first compartment manages coffee powder and the second compartment manages heating of water supplied to the first compartment for the preparation of the coffee beverage.

16. The coffee machine according to claim 14, wherein the partition wall is vertically oriented and the first compartment is positioned at the front of the housing where a user operates the coffee machine to prepare the coffee beverage and the second compartment is positioned behind the first compartment.

17. The coffee machine according to claim 12, wherein the partition wall is a solid wall that isolates the second compartment from the first compartment so that dust generated from the powder preparation component in the first compartment does not migrate to the components in the second compartment across the partition wall.

18. The coffee machine according to claim 12, wherein the automatic preparation by the machine of the espresso includes automatic delivery of the coffee powder to the at least one brewing group followed by automatic dispensing of the espresso by the dispensing component.

19. The coffee machine according to claim 18, wherein the automatic preparation by the machine of the espresso includes automatic preparation of coffee powder by the powder preparation component prior to delivery of the coffee powder to the at least one brewing group.

* * * * *